(12) United States Patent
Firouzi et al.

(10) Patent No.: US 11,221,244 B2
(45) Date of Patent: Jan. 11, 2022

(54) CLAMP-ON CIRCUMFERENTIAL RESONANCE ULTRASONIC FLOWMETER FOR COLLECTIVELY EXCITING AND RECEIVING CIRCUMFERENTIAL MODES OF A PIPE

(71) Applicant: The Board of Trustees of the Leland Stanford Junior University, Stanford, CA (US)

(72) Inventors: Kamyar Firouzi, Palo Alto, CA (US); Butrus T. Khuri-Yakub, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 175 days.

(21) Appl. No.: 16/609,001

(22) PCT Filed: Apr. 27, 2018

(86) PCT No.: PCT/US2018/029907
§ 371 (c)(1),
(2) Date: Oct. 28, 2019

(87) PCT Pub. No.: WO2018/201023
PCT Pub. Date: Nov. 1, 2018

(65) Prior Publication Data
US 2020/0209029 A1 Jul. 2, 2020

Related U.S. Application Data

(60) Provisional application No. 62/491,941, filed on Apr. 28, 2017.

(51) Int. Cl.
*G01F 1/66* (2006.01)
*G01F 1/708* (2006.01)
*G01F 1/74* (2006.01)

(52) U.S. Cl.
CPC .............. *G01F 1/662* (2013.01); *G01F 1/667* (2013.01); *G01F 1/7082* (2013.01); *G01F 1/74* (2013.01)

(58) Field of Classification Search
None
See application file for complete search history.

(56) References Cited

U.S. PATENT DOCUMENTS 3,916,699 A * 11/1975 Moran ................... G01N 29/14
73/623
4,007,627 A * 2/1977 Stansfeld ............... G01N 9/002
73/32 A (Continued)

OTHER PUBLICATIONS

Rautenberg et al, "Utilizing Leaky Lamb Waves in an Acoustic Waveguide for the Measurement of Liquid Properties", 2013, Sensors 2013, pp. 74-79.

*Primary Examiner* — Harshad R Patel
(74) *Attorney, Agent, or Firm* — Lumen Patent Firm (57) ABSTRACT

Clamp-on ultrasonic flow metering is provided by collectively exciting and receiving circumferential modes of the pipe. The pipe wall supports an infinite number of circumferential acoustic resonances. Each of these modes, in contact with a fluid, can mode-convert into the flow at a different rate. The mode-converted waves in the flow mode-convert back into the circumferential waves in the pipe once they travel across the flow. Furthermore, the moving fluid alters the rate of mode-conversion as a function of the flow velocity. At low frequencies, the wavelength is larger, thus the penetration depth in the flow is larger. As the frequency increases, the penetration depth becomes smaller. The variable penetration depth provides a methodology to sample the flow velocity profile.

10 Claims, 9 Drawing Sheets

(56) References Cited

U.S. PATENT DOCUMENTS

| | | | | |
|---|---|---|---|---|
| 4,168,295 A | * | 9/1979 | Sawyer | B01J 19/10 |
| | | | | 422/111 |
| 4,420,983 A | | 12/1983 | Langdon | |
| 4,735,097 A | * | 4/1988 | Lynnworth | G01N 29/343 |
| | | | | 73/861.28 |
| 4,838,127 A | | 6/1989 | Herremans et al. | |
| 6,412,354 B1 | | 7/2002 | Birchak | |
| 6,575,043 B1 | * | 6/2003 | Huang | G01F 1/002 |
| | | | | 73/861.18 |
| 9,897,529 B2 | * | 2/2018 | Xing | G01N 33/241 |
| 10,858,933 B2 | * | 12/2020 | Bose | G01V 1/50 |
| 2004/0123666 A1 | * | 7/2004 | Ao | G01N 29/024 |
| | | | | 73/644 |
| 2010/0000331 A1 | | 1/2010 | Gysling | |
| 2015/0276447 A1 | | 10/2015 | Black | |
| 2019/0242851 A1 | * | 8/2019 | Sinha | G01H 11/06 |
| 2020/0200663 A1 | * | 6/2020 | Gallagher | G01N 11/162 |
| 2021/0172847 A1 | * | 6/2021 | Gallagher | G01N 29/036 |

* cited by examiner

CLAMP-ON CIRCUMFERENTIAL RESONANCE ULTRASONIC FLOWMETER FOR COLLECTIVELY EXCITING AND RECEIVING CIRCUMFERENTIAL MODES OF A PIPE

CROSS-REFERENCE TO RELATED APPLICATIONS

This application is a 371 of PCT application PCT/US2018/029907 filed Apr. 27, 2018. PCT application PCT/US2018/029907 claims the benefit of U.S. Provisional application 62/491,941 filed Apr. 28, 2017.

FIELD OF THE INVENTION

This invention relates to measuring properties of fluid flow in pipes, such as flow rate.

BACKGROUND

An ultrasonic flowmeter is a type of flowmeter that measures the velocity of a fluid with ultrasound to calculate volume flow. Ultrasonic flowmeters are widely applied to measure flow in a variety of applications. Ultrasonic flowmeters use acoustic waves or vibrations to detect the flow traveling through a pipe. Ultrasonic energy is typically coupled to the fluid in the pipe using transducers that may be wetted (aka invasive) or non-wetted (aka non-invasive), depending upon the design of the flowmeter. This can either be done in-line, by inserting a spool piece with ultrasonic transducers into the pipe carrying the fluid, or by clamping the transducers on an existing pipe. Using ultrasonic transducers, the flowmeter can measure the average velocity along the path of an emitted beam of ultrasound by various methods.

Clamp-on meters are attractive as they can be installed without cutting the pipe or shutting down the flow, but their stability is limited, and they are unable to measure flow profiles (in contrast with expensive multi-path in-line meters), which limits their linearity at low flow speeds. Moreover, their installation typically requires complex manual alignment of the transducers and input of a variety of setup parameters (e.g., pipe dimensions and material properties, speed of sound in the fluid) by the user.

Figure 1:
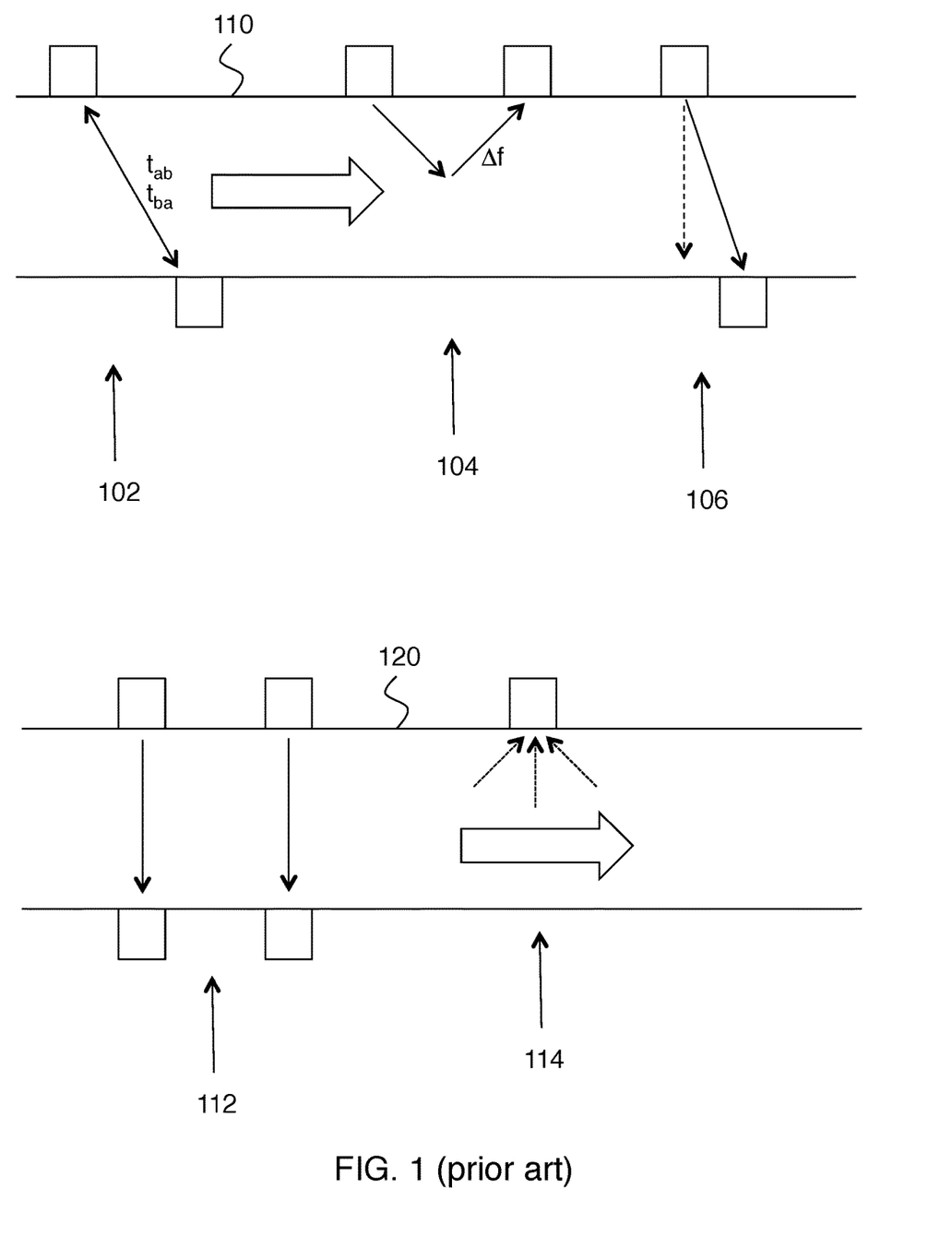
FIG. 1 schematically shows several conventional techniques for noninvasive ultrasonic flow metering.

There are several different ways by which ultrasonic signals can be utilized to calculate flow rate for clamp-on meters. FIG. 1 schematically shows five different non-invasive methods that can be used to measure flow in pipes 110 and 120: transit time 102, Doppler 104, beam deflection 106, cross correlation 112 and passive acoustics 114.

The three main types of non-invasive ultrasonic technology currently used are Transit-Time, Doppler, and Cross-Correlation, which are explained in-detail below. Passive Acoustics (e.g., 114 on FIG. 1) is a technique where the transducer simply 'listens' to the naturally occurring vortices or eddies in the flow. By monitoring how fast they flow by the transducer, a velocity can be derived. Beam Deflection (e.g., 106 on FIG. 1) works by transmitting an ultrasonic beam across the pipe which is slightly deflected by the flow. This deflection is monitored and is directly related to the velocity of the flowing medium.

Figure 2A:
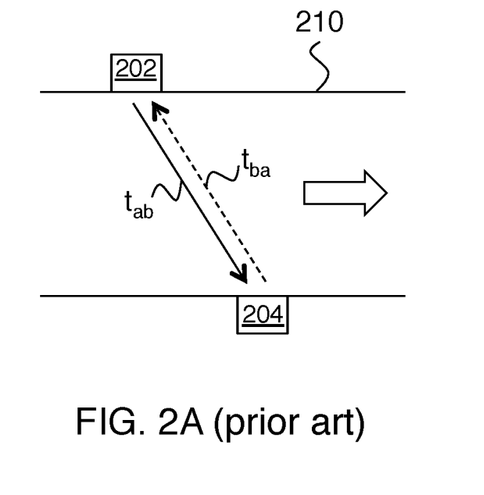
FIGS. 2A-B show transit time noninvasive ultrasonic flow metering.
Figure 2B:
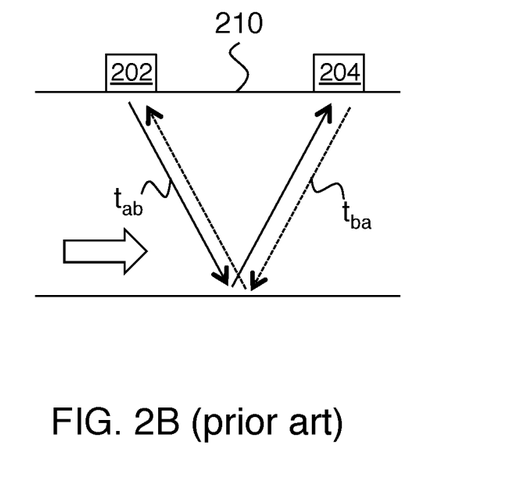

Transit-Time (e.g., 102 on FIG. 1 and FIGS. 2A-B) is the most common type of clamp on technology and can be used for both gases and liquids. The principle is based on the time difference it takes for an ultrasonic pulse to travel a defined distance both with and against flow. The difference is directly related to the velocity of the flow and is to some extent analogous to a boat crossing a river. If the boat is travelling with the current then it will be helped across to some degree by the flowing fluid but the opposite is true when travelling against the current. FIG. 2A is normally referred to as direct mode, i.e., the ultrasonic beam only makes one traverse across pipe 210. FIG. 2B is normally referred to as reflect mode as two traverses across pipe 210 are required. As shown in FIG. 2A, transducer 202 transmits an ultrasonic pulse across a pipeline which is received by transducer 204, or vice versa. Since the sound velocity for the flowing medium and the length the ultrasound travels are both known, a simple equation can be used to calculate the time taken for the ultrasonic signal to reach the receiving transducer. This is also known as the time-of-flight of the ultrasonic signal. Similarly, FIG. 2B shows transmission of sound from transducer 202 to transducer 204 (or vice versa) via reflection from the opposite pipe wall.

Figure 3:
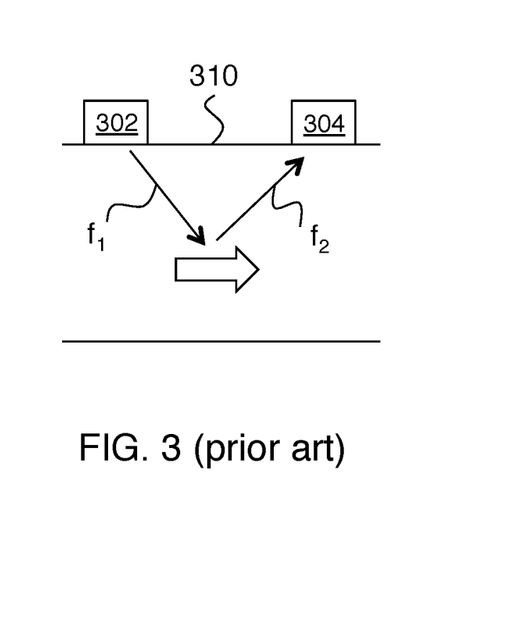
FIG. 3 shows Doppler noninvasive ultrasonic flow metering.

Doppler non-invasive ultrasonic flowmeters (e.g., 104 on FIG. 1 and FIG. 3) are based on the well-known Doppler principle and frequency shifts in the ultrasonic signal. In flow measurement, again two transducers are used and are often placed on the same side of the pipe. Most Doppler techniques require a small amount of gas or entrained solids in the flow in order to calculate a velocity. As shown on FIG. 3, transducer 302 emits an ultrasonic beam of a known frequency $f_1$. This beam reflects off either the gas bubbles or solids within the flow in pipe 310 and is thereby frequency shifted to frequency $f_2$. Transducer 304 then receives the frequency shifted ultrasonic signal and by measuring the change can derive a velocity.

Figure 4:
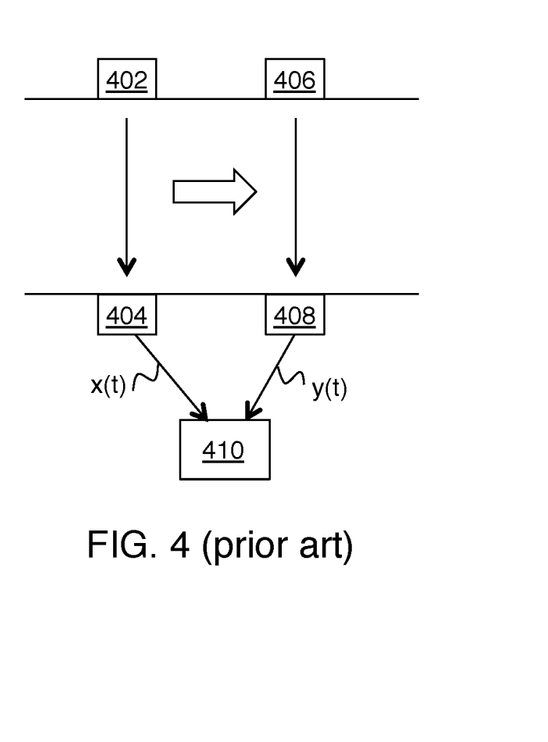
FIG. 4 shows cross-correlation noninvasive ultrasonic flow metering.

In the Cross-Correlation technique (e.g., 112 on FIG. 1 and FIG. 4), two pairs of transducers 402, 404 and 406, 408 are positioned on a pipe with both receivers (404 and 408) and both transmitters (402 and 406) on the same side of the pipe respectively. The transducer pairs are placed in the same plane in order to maximize the potential for correlating signals. The main difference between transit-time and cross-correlation flowmeters is that one transducer is always the transmitter and one transducer is always the receiver; they do not swap roles. FIG. 4 shows the transducer configurations: Both the upstream and downstream transducers transmit an ultrasonic pulse across the pipe that is modulated by naturally occurring eddies or vortices in the flow. The result is two very similar waveforms x(t) and y(t) that have distinctive peaks which are displaced by a time factor. This time factor is directly proportional to the distance between the pairs of transducers and inversely proportional to the flow velocity. To calculate the time difference a mathematical cross-correlation function is used, schematically shown by 410 on FIG. 4.

SUMMARY

A novel clamp-on ultrasonic flow metering technique is provided that is capable of measuring the flow rate and other parameters of a pipeline by collectively exciting and receiving circumferential modes of the pipe. The pipe wall supports an infinite number of circumferential acoustic resonances. Each of these modes, in contact with a fluid, can mode-convert into the flow at a different rate. The mode-converted waves in the flow mode-convert back into the circumferential waves in the pipe once they travel across the flow. Furthermore, the moving fluid alters the rate of mode-conversion as a function of the flow velocity. At low frequencies, the wavelength is larger, thus the penetration depth in the flow is larger. As the frequency increases, the penetration depth becomes smaller. The variable penetration depth provides a methodology to sample the flow velocity profile. By collectively exciting and receiving a large spectrum of the circumferential waves in the pipe, the information of frequency/mode-dependent mode-conversion rates are recorded. The flow rates are then estimated through analytical, computer based, and/or machine learning algorithms. The transducers preferably provide a broad-band excitation of the circumferential modes and with minimal excitation of the axisymmetric modes. This strategy ensures we mostly couple energy into the desired set of modes. The transducers can be connected to an electrical instrument such as a network analyzer, spectrum analyzer, impedance analyzer, time-domain pulser/receiver, etc., by which means the frequency response of the circumferential resonance modes of the pipe can be monitored and recorded as a function of flow velocity.

Applications of this method are to ultrasonic flow metering of any fluid flow, including gas flows, liquid flows, and mixed gas/liquid flows.

This work provides significant advantages. Our approach provides a non-invasive flow measurement. Since this approach is a clamp-on technique, it can be used as a temporary, semi-permanent or permanent method of measurement. It can be used to measure other flow characteristics such as pressure, temperature, composition, bubble content, velocity profile, etc. Our method will bring clamp-on sensors closer to in-line (i.e., wetted/invasive) sensors in terms of performance and applicability. It will greatly simplify the installation procedure and enhance safety. It will improve the accuracy and repeatability in the presence of changes in temperature, density, and composition, reducing maintenance needs. Moreover, the unique capability to measure the velocity profile is unavailable in current clamp-on meters. It also provides better sensitivity to the flow velocity with a wide dynamic range (i.e., can be used to measure very slow flow to very fast flow speeds). It will enable the accurate measurement of both laminar and turbulent flows, thus enhancing the linearity across a wide range of flow speeds. These improvements are expected to expand the application space of clamp-on flowmeters and thus offer an important competitive advantage to existing technologies. The availability of high-performance clamp-on sensors will also be a competitive advantage to end-users, e.g. in the oil-and-gas and chemical industries.

DETAILED DESCRIPTION

Figure 5:
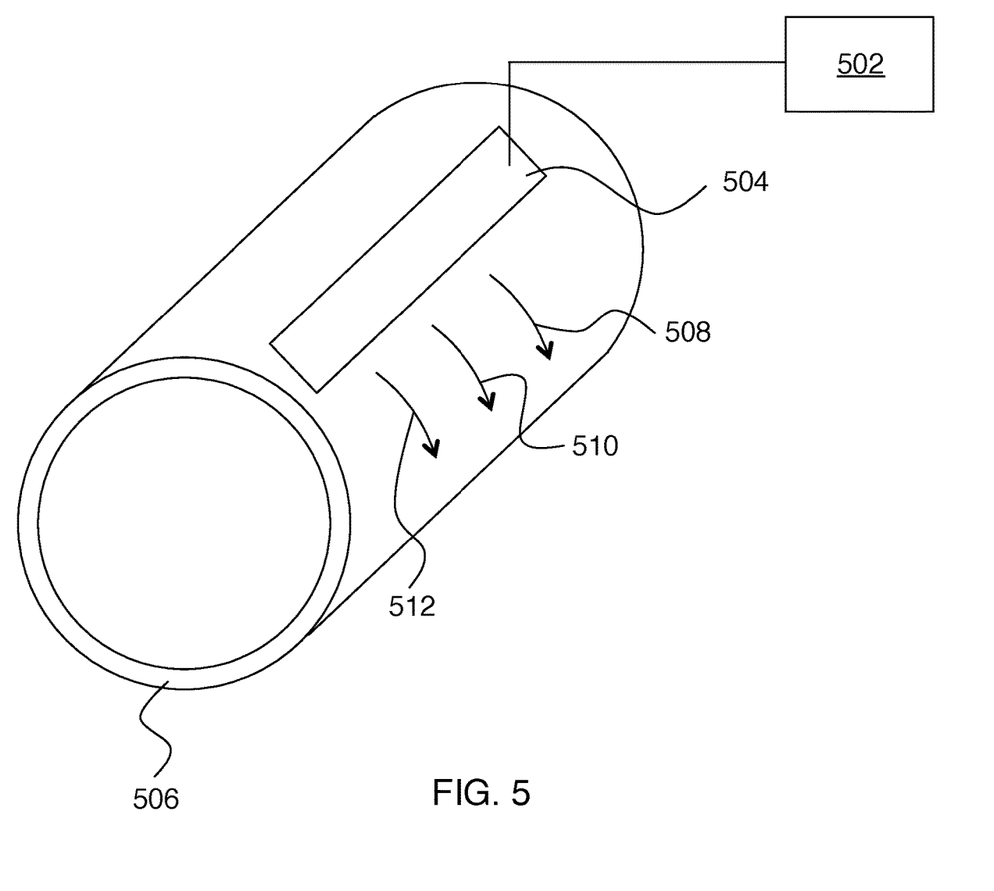
FIG. 5 shows operation of an embodiment of the invention.

FIG. 5 shows operation of an embodiment of the invention. In this example, fluid flows in a pipe 506. One or more acoustic transducers 504 are clamped, disposed on or otherwise affixed to an exterior surface of pipe 506, as shown. Two or more circumferential acoustic modes are excited by transducers 504 which are connected to processor 502. Here excitation of three distinct circumferential acoustic resonances 508, 510 and 512 is schematically shown, but any number of resonances greater than or equal to 2 can be excited in this manner.

One or more measurement parameters of each of the two or more circumferential acoustic resonances is measured, and the fluid flow rate in the pipe is determined by collective analysis of the measured one or more measurement parameters of each of the two or more circumferential acoustic resonances.

The fluid flow can be a gas flow, a liquid flow, a single phase flow or a multi-phase flow.

Practice of the invention does not depend critically on the kinds of transducers employed. Suitable transducers include but are not limited to: piezoelectric transducers, electromagnetic acoustic transducers, capacitive micromachined ultrasonic transducers, and piezoelectric micromachined ultrasonic transducers. Practice of the invention also does not depend critically on the geometrical configuration of the transducers, so wedge transducers, interdigital transducers and/or comb transducers can be employed. The transducers preferably provide a broad-band excitation of the circumferential modes and with minimal excitation of the axisymmetric modes. This strategy ensures we mostly couple energy into the desired set of modes.

The measurement parameters can include received acoustic intensity vs. frequency, received acoustic amplitude vs. frequency, complex acoustic impedance vs. frequency, resonance frequencies of the circumferential acoustic resonances, and Q factors of the circumferential acoustic resonances.

The collective analysis can be performed using machine learning that has been trained on a set of reference data. Alternatively, the collective analysis can be performed analytically or with a computer implemented numerical model. In cases where machine learning is used to provide the collective analysis, it is expected that detailed spectral data will be the most suitable measurement parameters to employ. By collectively exciting and receiving a large spectra of the circumferential waves in the pipe, the information of frequency/mode-dependent mode-conversion rates can be recorded. The flow rates can then be estimated through analytical, computer based, or machine learning algorithms.

In addition to flow rate, other fluid parameters can be determined according to these principles, such as pressure, temperature, composition, and bubble content.

Practice of the invention does not depend critically on the details of processor 502. Processor 502 will generally include control and detection circuitry to excite the desired circumferential acoustic resonances, and to receive the corresponding signals. For example, the transducers can be connected to an electrical instrument such as a network analyzer, spectrum analyzer, impedance analyzer, time-domain pulser/receiver, etc., by which means the frequency response of the circumferential resonance modes of the pipe can be monitored and recorded as a function of flow velocity.

Accordingly, this approach provides a novel clamp-on ultrasonic flow metering technique capable of measuring the flow rate and other parameters of a pipeline by collectively exciting and receiving circumferential modes of the pipe.

Figure 6:
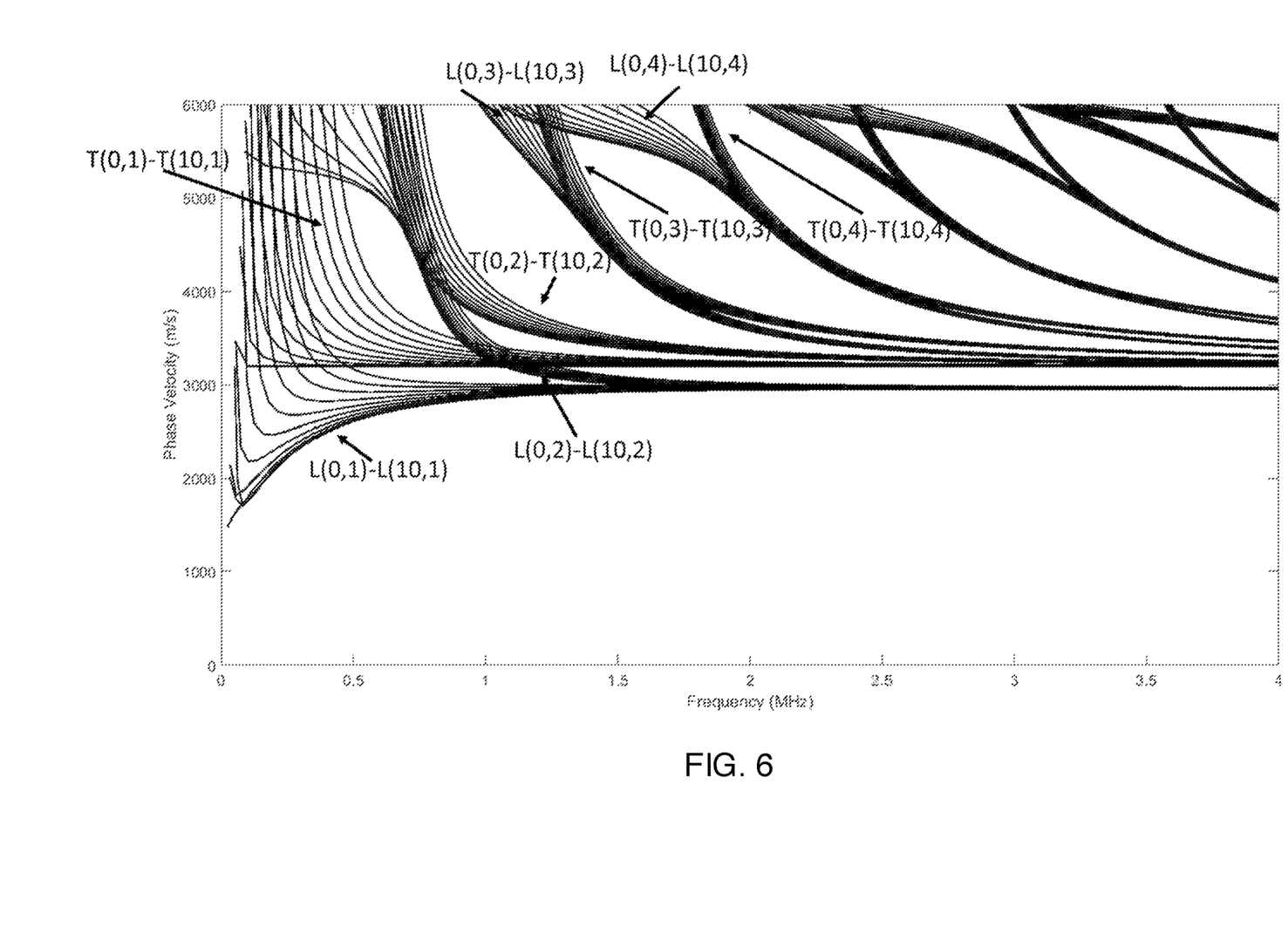
FIG. 6 shows an exemplary set of acoustic mode dispersion curves.
Figures 7A, 7B, 7C, 7D, 7E:
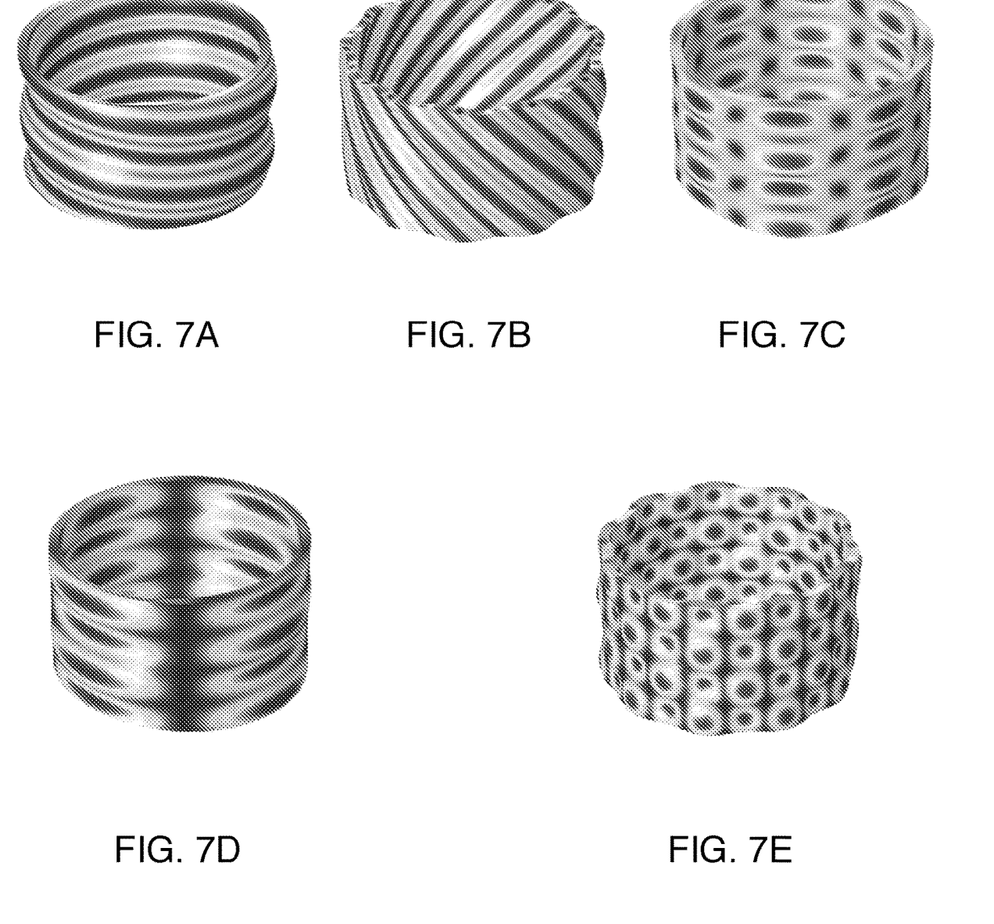
FIGS. 7A-E show exemplary excitation patterns for some circumferential acoustic resonances in a pipe.

FIG. 6 shows an exemplary set of acoustic mode dispersion curves. More specifically, these are sample dispersion curves of three-inch schedule 40 steel pipe including all of the longitudinal and torsional modes, including axisymmetric modes $L(0, n)/T(0, n)$ ($n=1, 2, 3, \ldots$) and non-axisymmetric modes $L(m, n)/T(m, n)$ ($m=1, 2, 3, \ldots, n=1, 2, 3, \ldots$). Waves propagating in a thin-wall and infinitely long pipe are guided waves whose amplitudes are modulated by the circumferential vibrational modes of the pipe. These waves include axisymmetric and non-axisymmetric (circumferential) modes. They can propagate without significant attenuation and can leak into the surrounding medium efficiently, through mode-conversion from guided waves to compressional acoustic waves. Mode-converted compressional waves can also mode-convert back into guided waves through the reciprocity principle. These modes are frequency-dependent and thus dispersive (i.e., they propagate at different speeds at different frequencies). Typical dispersion curves are shown in FIG. 6. Dispersion has a strong effect on the propagation of guided waves.

Examples of different circumferential modes of the pipes are shown in FIGS. 7A-E. Guided waves couple the displacement of the outer and inner surfaces of the pipe wall, unlike surface waves or bulk waves. Consequently, one can efficiently transmit and receive energy from one side (outside the pipe) to the other side (inside the pipe). This provides a suitable means to measure the flow velocity, its profile, and possibly other important parameters such as pressure, temperature, composition/phases, etc.

Figure 8:
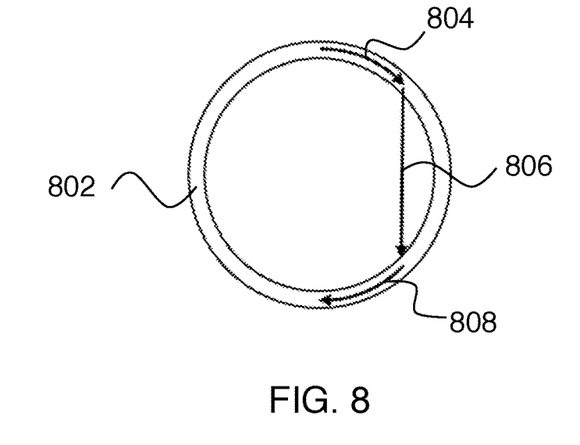
FIG. 8 schematically shows a double mode conversion process relevant to operation of some embodiments of the invention.
Figure 9A:
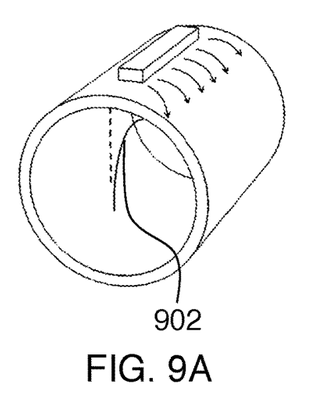
FIGS. 9A-D show different circumferential acoustic resonances having different penetration depths in the flowing fluid.
Figure 9B:
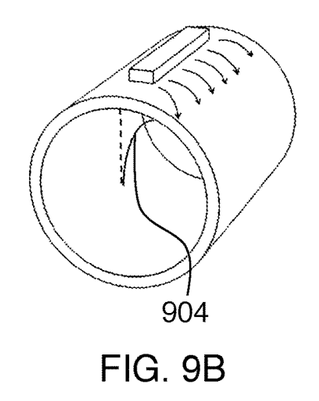
Figure 9C:
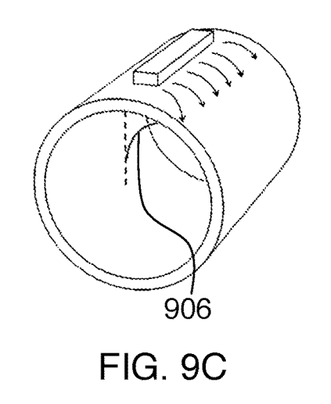
Figure 9D:
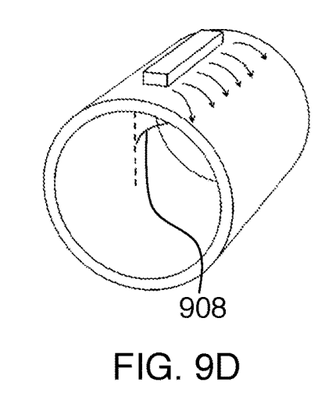

FIG. 8 schematically shows a double mode conversion process relevant to operation of some embodiments of the invention. A circumferential resonance mode 804 of pipe 802, in contact with a fluid, can mode-convert to a fluid compressional wave 806. The mode-converted wave 806 in the flow can then mode-convert through the reciprocity principle back into the circumferential wave 808 in the pipe 802 once it travels across the flow. Such mode conversion rates typically vary from one circumferential mode to another. The mode-conversion rate is approximately a few wavelengths. Moreover, when there is a flow through the pipe, the mode-conversion rate changes as a function of the flow speed.

This concept can also be expressed in terms of energy leakage from the circumferential acoustic mode. Some amount of acoustic energy (A) will leak out of the acoustic resonance into the flowing fluid (excitation of leaky waves, mode conversion, loss, etc.), and some of that apparently lost energy (B) will couple back into the acoustic resonance (via double mode conversion). So the net loss from the resonance is A-B instead of A. The net loss will affect acoustic signals such as impedance spectra etc.

FIGS. 9A-D show different circumferential acoustic resonances having different penetration depths in the flowing fluid. At low frequencies, the wavelength is larger, thus the penetration depth in the flow is larger. As the frequency increases from FIG. 9A to FIG. 9D, the penetration depth becomes smaller, as indicated by 902, 904, 906, 908 respectively. This variability of the penetration depth provides a methodology to sample the flow velocity profile.

Here we describe a prototype of a circumferential resonance flowmeter. A 50 mm×2 mm×1 mm piezoelectric element was bonded to the wall of a steel pipe. The contact point between the piezoelectric element and the pipe provides the electric ground connection and the opposite face of the element provides the signal electrode. The piezoelectric element was then electrically connected to a spectrum analyzer or pulser/receiver, by which means the circumferential resonances of the pipe were excited and monitored, while different flow rates were passing through the pipe. The spectrum analysis was performed in the 50 kHz-2 MHz frequency range.

Figure 10A:
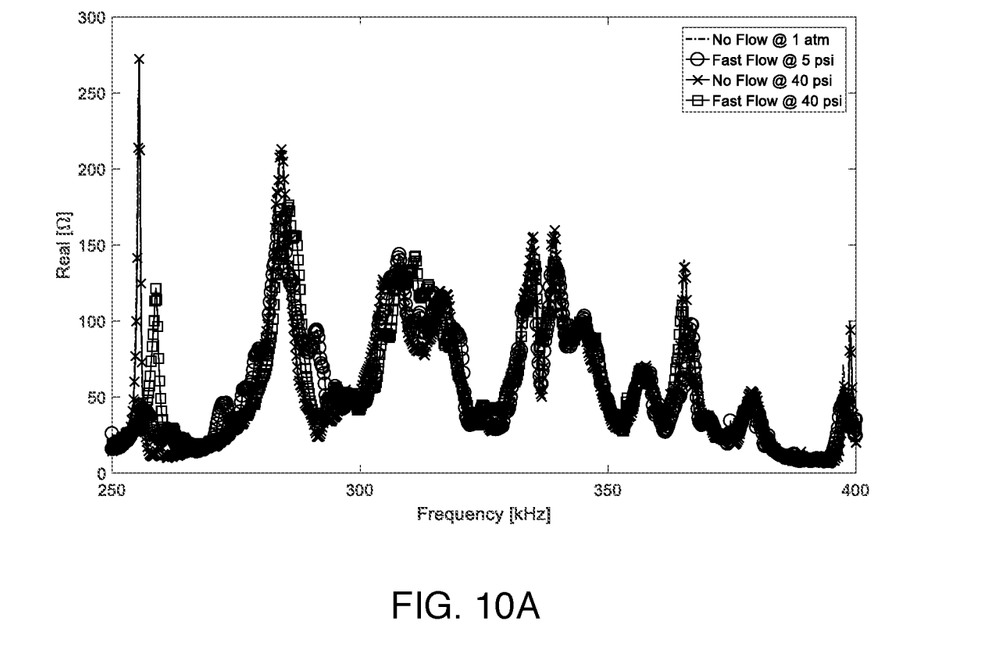
FIGS. 10A-B show a first example of data according to principles of the invention.
Figure 10B:
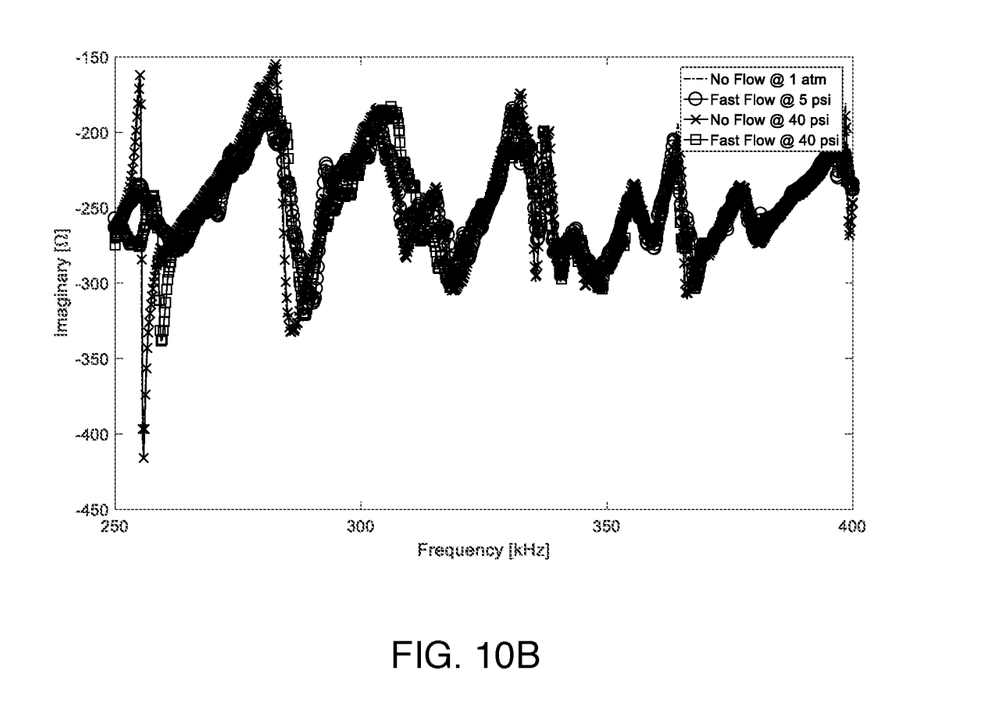

In one set of experiments, we utilized the prototype in measuring the flow rate of air. The spectra as a function of flow rate were monitored and recorded on a spectrum analyzer. FIGS. 10A-B show the real and imaginary impedance data, respectively, of the piezoelectric element. The peaks of the data represent the different resonances of the pipe, which are modulated as different flow rates pass through the pipe.

Figure 11A:
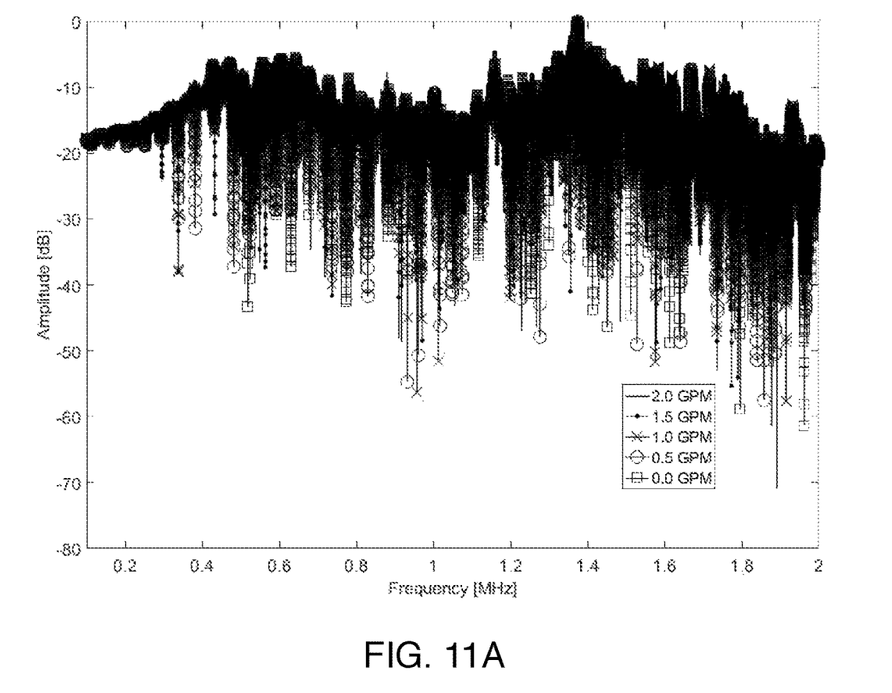
FIGS. 11A-C show a second example of data according to principles of the invention.
Figure 11B:
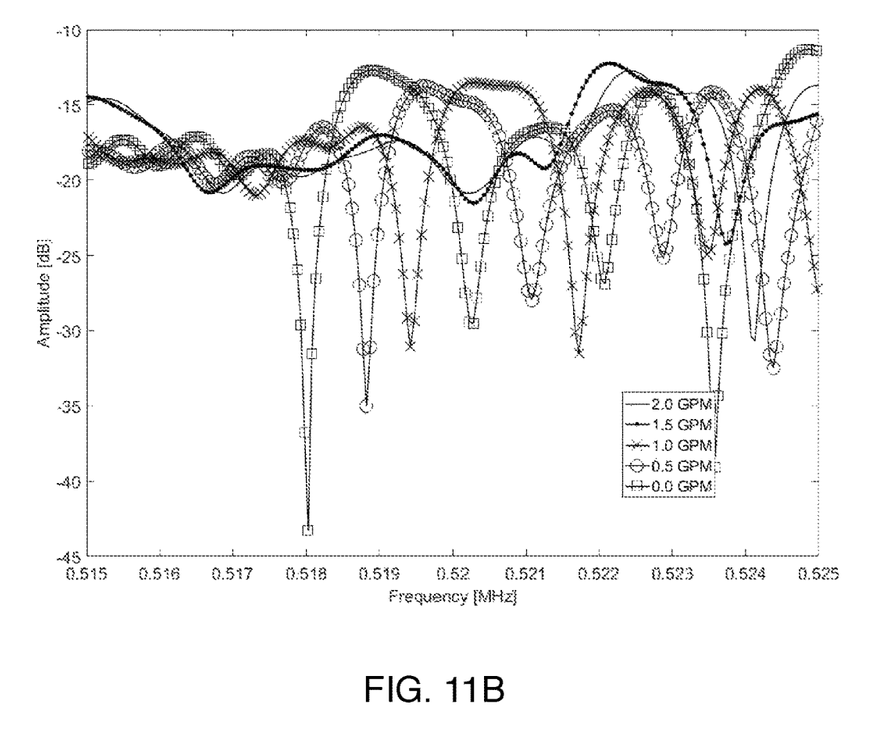
Figure 11C:
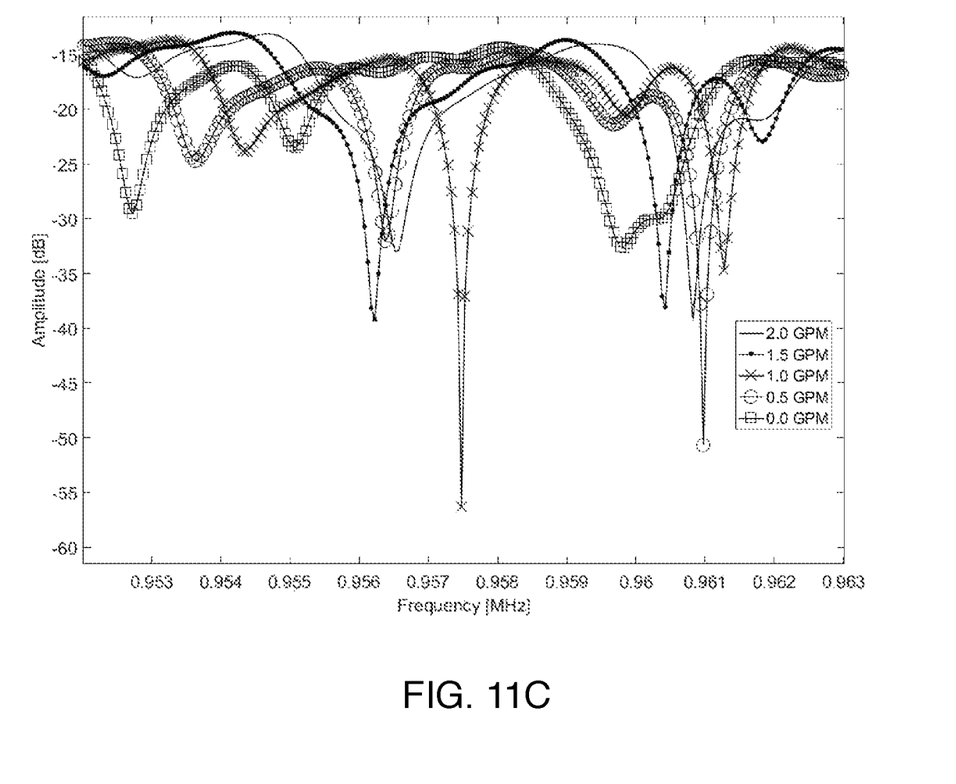

In the second set of experiments, we utilized the prototype in measuring the flow rate of water. The spectra amplitudes as a function of flow rate were monitored and recorded using a pulser/receiver. FIGS. 11A-C show the spectra of the echo data of the piezoelectric element, with FIG. 11A being the full spectrum and FIGS. 11B and 11C being zoomed views of the spectrum at selected frequency ranges. The peaks of the data represent the different resonances of the pipe, which are modulated as different flow rates pass through the pipe.

The invention claimed is:

1. A method of measuring fluid flow rate in a pipe, the method comprising:
   disposing one or more acoustic transducers on an exterior surface of the pipe;
   exciting two or more circumferential acoustic resonances in the pipe with the one or more acoustic transducers driven at two or more resonance frequencies;
   measuring one or more measurement parameters of each of the two or more circumferential acoustic resonances; and
   determining the fluid flow rate in the pipe by collective analysis of the measured one or more measurement parameters of each of the two or more circumferential acoustic resonances.

2. The method of claim 1, wherein the fluid flow is a gas flow.

3. The method of claim 1, wherein the fluid flow is a liquid flow.

4. The method of claim 1, wherein the fluid flow is a single-phase fluid flow.

5. The method of claim 1, wherein the one or more acoustic transducers are selected from the group consisting of: piezoelectric transducers, electromagnetic acoustic transducers, capacitive micromachined ultrasonic transducers, and piezoelectric micromachined ultrasonic transducers.

6. The method of claim 1, wherein the two or more circumferential acoustic resonances have different penetration depths into fluid flowing in the pipe, whereby a fluid flow rate profile vs. radius can be determined.

7. The method of claim 1, wherein the measurement parameters includes one or more parameters selected from the group consisting of: received acoustic intensity vs. frequency, received acoustic amplitude vs. frequency, complex acoustic impedance vs. frequency, resonance frequencies of the circumferential acoustic resonances, and Q factors of the circumferential acoustic resonances.

8. The method of claim 1, wherein the collective analysis is performed using machine learning that has been trained on a set of reference data.

9. The method of claim 1, wherein the collective analysis is performed analytically or with a computer implemented numerical model.

10. The method of claim 1, further comprising determining one or more fluid parameters selected from the group consisting of: pressure, temperature, composition, and bubble content.

\* \* \* \* \*